April 28, 1936. W. H. HONISS 2,039,242
GLASS FEEDING METHOD AND APPARATUS
Filed Sept. 17, 1932 2 Sheets-Sheet 1

Witness:
A. A. Horn

Inventor
Wm. H. Honiss
by Brown & Parham
Attorneys.

April 28, 1936.  W. H. HONISS  2,039,242
GLASS FEEDING METHOD AND APPARATUS
Filed Sept. 17, 1932    2 Sheets-Sheet 2
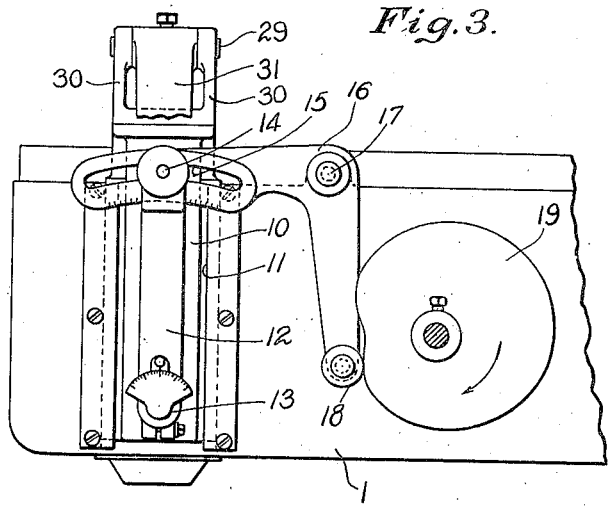
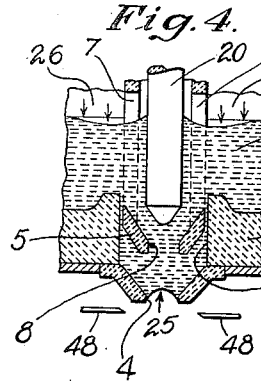
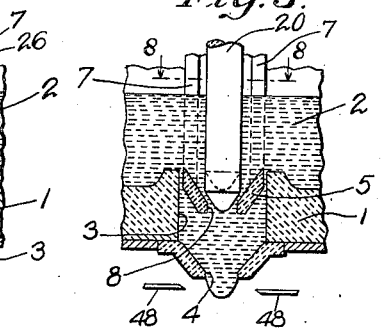
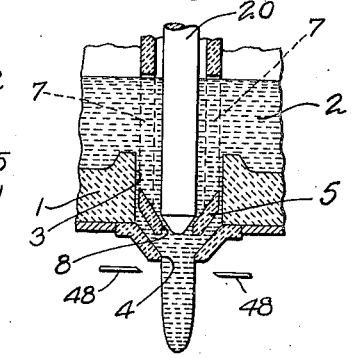
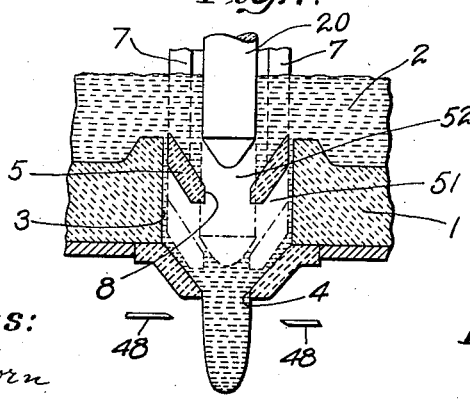
Witness:
A. A. Horn
Inventor
Wm. H. Honiss
by Brown & Parham
Attorneys.

Patented Apr. 28, 1936

2,039,242

UNITED STATES PATENT OFFICE 2,039,242

GLASS FEEDING METHOD AND APPARATUS

William H. Honiss, West Hartford, Conn., assignor to Hartford-Empire Company, Hartford, Conn., a corporation of Delaware Application September 17, 1932, Serial No. 633,618

20 Claims. (Cl. 49—55)

This invention relates generally to the automatic feeding of molten glass from a supply body and converting it into successive separate measured charges of weights, shapes and viscous plastic condition suitable for further and immediate conversion into various forms of glassware.

It more particularly relates to methods and apparatus of the type disclosed in U. S. Patent No. 1,675,819, in which, as in the present invention, the glass is flowed in a column from the supply body to a submerged pump chamber through a flow passage in the interior of a reciprocating hollow plunger which operates as a pump piston in the chamber to forcibly discharge a charge of glass therefrom by each downstroke and replenish the pump chamber with new glass from the supply body by its next upstroke.

Each charge consists of two components, i. e., the stub and other residual glass left in the chamber and its outlet after the discharge and severance of the previous charge, and a portion of the new glass sufficient to make up the required charge weight. As the charges are discharged from the chamber, they preferably remain suspended from the outlet until they become full size and are then severed and delivered to molds.

In the feeder of the above Patent No. 1,675,819, the inflow passage from the supply body to the pump remains open throughout the feeding operations. This permits some regurgitation or backflow of glass from the chamber during the downstroke of the plunger which obviously forces the glass beneath it upwardly as well as downwardly. To restrain or minimize such backflow, reliance is placed upon the effects of gravitation or hydrostatic head of the supply body which aid inflow but oppose backflow. Variations in the hydrostatic head or in the viscosity of the glass would affect the volume of both the inflow and backflow, and adjustments of the regulating member to compensate for resultant variation in downflow would proportionately vary the backflow. Such backflow would cause a proportionate dissipation of the plunger pressure and reduction of volume of the glass in the chamber. Such loss of volume by adjusting the regulating member would be corrected by lengthening the stroke of the plunger which, however, would not lessen the dissipation of its downward pressure.

In the present invention regurgitation and the consequent dissipation of plunger pressure and loss of volume are or may be wholly prevented by automatic means for nearly or wholly closing the flow passage during each downstroke of the plunger, and if desired, for preventing inflow of new glass to the chamber during the initial part of the plunger upstroke. The apparatus thus constitutes a volumetric pump.

A general object of the present invention is to provide more complete adaptation and control of the feeding operations, especially of the pumping, measuring, proportioning and shaping functions. More specifically, the objects are to periodically interrupt and restore the continuity of the column of glass flowing into the pump chamber, so as to temporarily segregate the glass therein from the supply body and prevent or reduce to a negligible minimum the leakage and consequent loss of glass volume and dissipation of plunger pressure by backflow of the glass column from the pump chamber during the forcible discharge of each charge therefrom, thus more accurately determining and uniformly maintaining the weight and shape of whatever size or form of mold charge is being made. Also to determine and uniformly maintain the proportions of the residual and new glass composing each charge, and to insure the prompt and regular discharge of the residual glass, to maintain the weight and homogeneity of the succeeding charges. Also to regulate the time and extent of retracting or holding-back the residual glass in the pump chamber relative to the time and volume of inflow of new glass to the chamber to complete the next charge. Also to allow the use of a shallower supply body of glass. Also to improve "multi-weight" feeding, i. e., feeding repeated series of different weights and/or shapes in alternation by the same feeder, all independently of changing viscosity and/or hydrostatic head.

These and further objects, novel features and advantages of the invention will be apparent from the following description and from the accompanying drawings.

The basic principles of the present invention may be applied in different ways and by different apparatus. Other specific embodiments of those basic principles are disclosed in the related patent applications Serial Nos. 633,617 and 633,619, filed concurrently herewith, to which reference is made for claims also covering this invention.

Figure 1 of the drawings is a front elevation, partly in section, of a glass feeder of this internal flow type and the operating mechanism therefor;

Fig. 3 is a side elevation of a portion of the machine of the preceding views;

Figure 8:
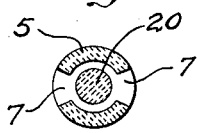

Figs. 4, 5, and 6 are elevations illustrating a complete cycle of the feeding operations;

Fig. 7 is a sectional elevation on an enlarged scale illustrating diagrammatically by its white areas the volume of the plunger and valve displacements and the imaginary vacuum spaces vacated by their retractive movements; and Fig. 8 is a plan view of the plunger and valve in section taken on the line 8—8 of Fig. 5.

As shown in these drawings, a supply body of molten glass is contained in a forehearth 1 to which the glass may flow by gravity or otherwise from a larger source, usually from a glass melting "tank" or furnace. In the floor of the forehearth and submerged by the glass therein is a well-like pump chamber 3 which terminates at its lower end in a valveless discharge outlet 4. The forehearth may be constructed, supported and supplied with glass in any well-known manner. The size and/or configuration of the outlet 4 likewise may be varied, in any suitable known manner, as by the selective use of different outlet spouts or rings.

A hollow plunger 5 projects into the glass in the pump chamber, operating as a piston therein and has inlet openings 7 through its side walls and an internal flow passage 8 at its lower end. Thus, when the internal flow passage 8 is open, molten glass may flow from the supply body of glass through the inlet openings 7 and flow passage 8 into the pump chamber 3, which is of sufficient size to hold a volume of glass exceeding the largest mold charge to be fed by the same feeder.

The lower end of the plunger fits loosely enough in the pump chamber to allow between them an annular lubricating film or lining of glass which adheres to their surfaces and is thick enough to prevent abrasive contact between the plunger and the wall of the chamber without allowing any appreciable flow of free glass therethrough.

The plunger 5 may be supported, guided and reciprocated vertically in any way suited to the construction of the machine employed. The plunger operating mechanism shown is similar to that which is disclosed in the aforesaid Peiler Patent 1,675,819. The upper end of the plunger is clamped to an arm 9 which overhangs the forehearth, and is carried by a vertically reciprocated slide 10 which slides vertically in the guideway 11 at the side of the forehearth. A link 12 is pivotally and adjustably connected at its lower end by an eccentric pivot 13, Fig. 3, with the slide 10 and is pivotally and adjustably connected at its upper end by a pivot 14, with the arcuate slot 15 in an angle lever 16 which is mounted on a fixed pivot 17 and is provided with a cam roll 18 in contact with a cam 19. Rotation of the cam 19 will reciprocate the plunger 5 with a stroke which may be varied in amplitude by adjusting the pivotal connection 14 between the link 12 and the lever 15 without changing the lower limit of the plunger stroke with respect to the outlet 4. That lower limit may be changed by adjusting the eccentric pivot 13 between the link 12 and the slide member 10. The cam 19 may be adjusted around the shaft 41, or be replaced by cams having different configurations so as to vary the plunger movements according to the results desired.

A valve 20 for controlling or stopping the flow of glass through the plunger passage 8 into the chamber 3 is carried by and mounted for vertical reciprocation in the bore of the plunger, and may have a bearing sleeve 21 on its upper portion arranged to fit slidably in a bushing 22 in the upper portion of the tubular plunger 5 so that the valve member 20 will be maintained in centered relation to the passage 8 during its reciprocatory movements.

The upper portion of the valve 20 is provided with a slotted collar 23, in which pivot blocks 24 (Fig. 2) mounted in the forked end of an angle lever 27 fit slidably. The lever 27 is mounted on a horizontal pivot 29 which may be carried by upstanding ears 30 on the arm 9.

The lower arm 31 of the angle lever 27 carries a pivot stud 32 on which is mounted a pivot block 33, sliding in a vertical guideway 34 in a laterally moving guide member 35 at one end of a horizontal slide bar 36 (Figs. 1 and 2), which slides in a supporting bracket 38. The other end of the slide bar 36 is provided with a cam roll 39 engaging with a cam 40, which operates through the described connections to raise and lower the valve 20 relative to the plunger and thereby open and close the passage 8 to any desired extent and at any desired positions of the plunger.

Inasmuch as the valve and its angle lever 27 are connected by the pivot 29 with the plunger and its slide 10, and are moved up and down together by the cam 19, it is only necessary for the valve cam 40 to move the valve far enough to open and close the passage 8, as indicated by comparison of the valve positions shown in Figs. 4 and 5, so that changes in the length or character of the plunger stroke by adjustment of the link 12 or changing the cam 19 do not affect the time or extent of opening and closing the valve by the same cam 40. Either of the cams 19 or 40 can be changed without requiring change in the other cam.

The cam 40 may be driven by any suitable mechanism in synchronized or suitably timed relation with the cam 19 and other related working parts of the glass feeder. In the construction shown in the drawings, the cams 19 and 40 respectively are carried by shafts 41 and 42, connected by mitre gears 43 and 44, so that the cams 19 and 40 will be rotated in unison.

Figure 1:
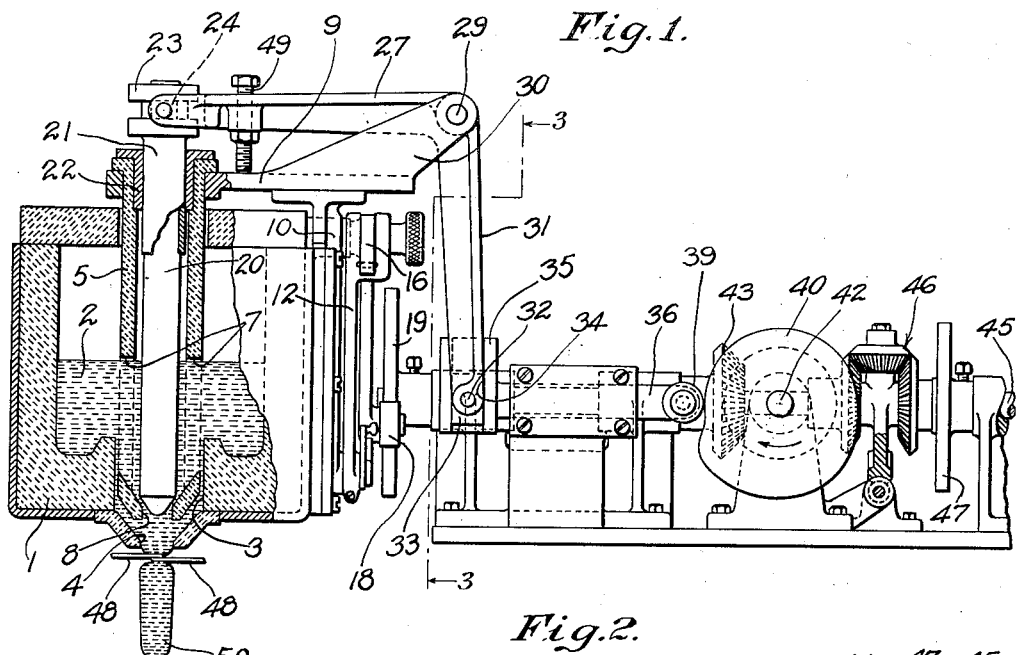
Figure 2:
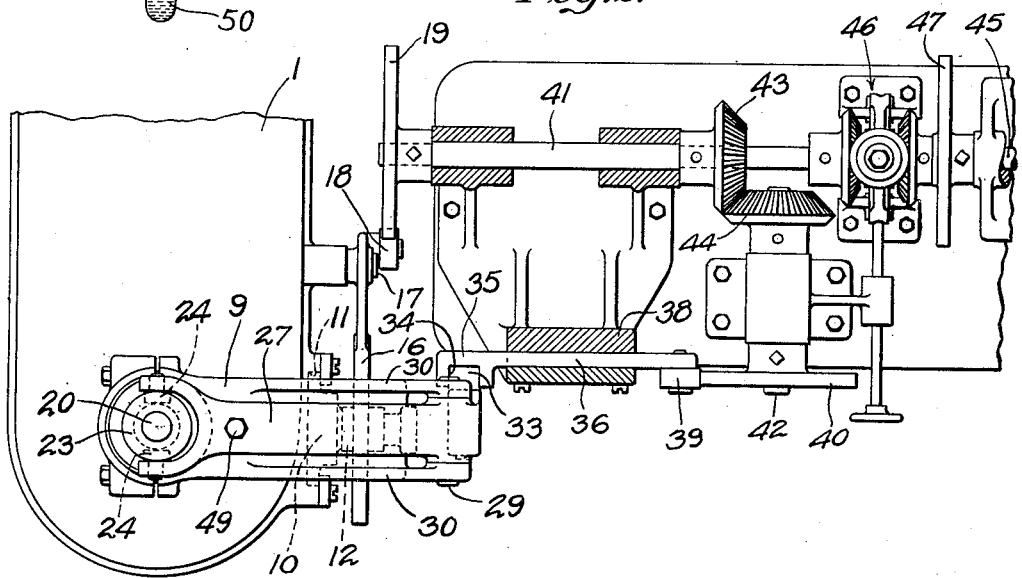
Fig. 2 is a plan view of the machine of Fig. 1, with portions thereof shown in section.

The shaft 41 may be driven from a drive shaft 45, Figs. 1 and 2, through the medium of an adjustable motion transmitting mechanism, indicated generally at 46, and now well known as a "phase adjustment", whereby the driven shaft 41 may be turned forwardly or backwardly relative to the drive shaft 45, so that the time of operating mechanism driven by the shaft 41 may be advanced or retarded relative to the time of operating mechanism driven by the shaft 45. Such adjustment mechanisms are disclosed in U. S. Patent No. 1,760,254, are well known in the art, and therefore need not be described in detail herein.

In the present instance the drive shaft 45 may carry a cam 47, for operating any suitable mechanism (not shown) for closing and opening the shear blades 48 to sever the mold charges as they are discharged from the outlet 4. The phase adjusting mechanism 46 may be employed to change the time of operating the plunger 5 and its valve 20 relative to the time of operating the shears.

An adjustable stop screw 49 in the arm of the lever 27 bears against the arm 9 to prevent the lower end of the valve from seating in the plunger whenever the cam 40 is removed, a clearance space between these parts being maintained to admit a film of glass without however permitting any substantial volume of flow between them.

A typical operation of the above described mechanism may be substantially as follows: Each upstroke of the plunger tends to create a void in the space vacated by the rising end of the plunger. That space is entirely enclosed by a sealing blanket of residual glass left in the chamber and its outlet after the discharge and severance of the previous charge, (Fig. 1), so that the vacuum would be substantially complete, allowing the unopposed full differential atmospheric pressure at 25 below the residual glass to force that glass upwardly into the substantially unopposing space and against the plunger as fast as it rises. During the initial upward movement of the plunger, the valve remains substantially closed (Fig. 1) until the residual glass, including the severed stub, has been pushed back into the chamber far enough to reheat whatever chill the stub has received by its exposure to the relatively cold air and by its contact with the shears. This retractive action will lift the stub away from the shear blades, as they are closed to sever a mold charge 59, as shown in Fig. 1, thus minimizing the heating of the shears and the chilling of the stub. Then the valve is opened (Fig. 4) to allow new glass from the supply body to be forced through the passage 8 and into the chamber by the same differential atmospheric pressure at 26 (indicated by small arrows) on the surface of the glass. The pressure from below at 25 continues to hold the residual glass in its retracted position, so that the new and residual glass are compressed together in the chamber and unite perfectly, since no air can have entered between them.

When the plunger reaches the top of its stroke, the chamber is full of glass. The vacuum and all differential pressure effects cease, leaving the glass momentarily free to flow from the outlet by gravity, which it may be allowed to do until the point of the charge acquires the desired size and shape, during which time, or while closing the valve 20, the plunger may remain stationary (Fig. 5).

The plunger with its valve closed is then moved downwardly to discharge a mold charge through the chamber outlet by its dynamic action. The rapidity of its movement at different portions of its stroke may be varied by substituting suitably shaped cams for the cam 19, so as to vary the rate of discharge of successive portions of the length of the charge, thereby varying its contour and length without necessarily changing its weight or volume, which may be independently increased or reduced by increasing or reducing the length of the plunger stroke, and its consequent volumetric displacement. Since regurgitation or backflow of glass from the chamber to the supply body is substantially prevented by the closed valve 20 during each downstroke, the pressure of the plunger is entirely or substantially confined to discharging measured charges from the chamber. The volume, weight and shape of each charge and of succeeding charges are thus accurately, definitely and uniformly controlled.

The vacuum spaces 51, 52 which the upward movements of the plunger and its valve tend to create in the glass are indicated diagrammatically in Fig. 7 by the white spaces 51 and 52 respectively. In practice, voids never actually occur in these spaces, because glass is forced by differential atmospheric pressure into the spaces vacated by the lower ends of the plunger and the valve as fast as they are vacated. For the purpose of this illustration, the differential pressure is assumed to be suspended.

The weights of the plunger and of their supporting parts may be expected to hold their respective cam rolls in contact with their respective cams 19 and 40, otherwise the customary springs may be employed.

This machine may also be adapted for multi-weight feeding, i. e., feeding charges which vary in weight and/or shape in cyclic order. For example, in feeding repeated series of charges comprising two different weights and/or shapes, the mechanism may be geared so that the cams make one revolution for each series of two differing charges, two-lobed cams may be substituted for operating the shears, plunger and valve and the lobes of such cams may be so shaped that the respective parts will operate to produce the different weights and/or shapes desired.

In my related applications, Serial Nos. 633,617 and 633,619, filed concurrently herewith, other species of the broad invention are disclosed as resulting in improvements in other forms of "pumping" glass feeders. The claims of the present application are limited to species disclosed in the present application, as distinguished from the species of said related applications, but are not to be otherwise limited except as required by the plain meaning of the terms thereof and by the prior art.

I claim:

1. Apparatus for feeding molten glass from a supply body, comprising a chamber, a reciprocating hollow impeller in the chamber, an inflow passage from the supply body through the impeller into the chamber, a valve for the inflow passage, means to open the valve to allow inflow from the supply body during retraction of the impeller, and to close the passage against backflow to the supply body during the expulsive movement of the impeller.

2. Apparatus for feeding molten glass from a supply body, comprising a container for the molten glass, said container having a submerged chamber terminating at its lower end in a discharge outlet, a reciprocating piston having its lower end portion fitting within said chamber closely enough to prevent appreciable flow of glass past the outside of the piston but without contacting with the walls of the chamber, and having an internal flow passage from the supply body to the chamber, and means for stopping inflow of glass to the chamber from the supply body through said internal flow passage during the expulsive movement of the piston in the chamber and for permitting inflow of glass to the chamber through said internal flow passage during retractive movement of the piston.

3. Apparatus for feeding molten glass from a supply body, comprising a chamber, a reciprocating impeller in the chamber, said impeller having an internal passage for glass flow communication between the supply body and the chamber, a valve for controlling said passage, and means to open the valve to allow inflow from the supply body to the chamber during retraction of the impeller and to close the passage against backflow to the supply body during expulsive movement of the impeller.

4. Glass feeding apparatus comprising a container having a pump chamber submerged by glass in the container, said pump chamber terminating at its lower end in a discharge outlet, a reciprocating plunger having its lower end portion depending into the glass in the chamber and fitting the chamber closely enough to prevent any appreciable flow of glass between said plunger and the walls of the chamber, said plunger having an internal passage for flow of glass from the container to the pump chamber, a valve and means for operating the valve to close said internal flow passage during each downstroke of the plunger and for a predetermined part of each upstroke of the plunger and then to open said flow passage to admit a predetermined quota of glass from the container to the pump chamber prior to the succeeding downstroke of the plunger.

5. Glass feeding apparatus comprising a glass container having a pump chamber covered by the glass, said pump chamber terminating at its lower end in a discharge outlet, a plunger reciprocating in the glass and having its lower end depending continuously in said pump chamber during operation and preventing any appreciable flow of the glass between the plunger and the walls of the pump chamber, said plunger having an internal passage for flow of glass from the container to the pump chamber, a valve and means for periodically operating the valve to prevent substantial backflow of glass from the pump chamber through said internal flow passage during the expulsive movement of the plunger and for permitting inflow of glass from the container to the pump chamber during a regulated portion of the retractive movement of the plunger.

6. In glass feeding apparatus, the combination with a glass container having a pump chamber submerged by glass in the container, said pump chamber terminating at its lower end in a discharge outlet, of a reciprocating tubular glass discharge regulating member having its lower end constantly in position to cooperate with the walls of the pump chamber to prevent appreciable movement of glass between said discharge regulating member and the walls of the pump chamber, said tubular member having an inlet for glass flow from the supply in the container, and having an outlet at its lower end for flow of glass to said pump chamber, a valve and its operating means for closing the outlet from said tubular member to the pump chamber to prevent backflow of glass during movement of the tubular member toward the outlet and for opening the outlet of the tubular member to permit inflow of glass to the pump chamber during retractive movement of said tubular member.

7. In glass feeding apparatus, the combination with a glass container having a pump chamber located below the level of the glass in the container and terminating in a discharge outlet, a reciprocating tubular plunger operating in said pump chamber, said tubular plunger having an inlet for flow of glass thereinto from a supply body in the container and an outlet at its lower end for flow of glass to the pump chamber, a valve reciprocable within the tubular plunger for controlling flow through the outlet of the latter, and means for reciprocating said tubular plunger and said valve as a unit during each downstroke and for a predetermined part of each upstroke of the plunger, and for then imparting an additional lift to the valve to open the outlet of said tubular plunger.

8. In glass feeding apparatus, a container for the glass, said container having a submerged pump chamber terminating at its lower end in a discharge outlet, a reciprocable tubular plunger having its lower end portion working in said pump chamber, said tubular plunger having an inlet for glass from the container and an outlet at its lower end for flow of glass therefrom to the pump chamber, a valve reciprocable within the hollow plunger for controlling flow through the outlet of the latter to the pump chamber, and means for reciprocating said valve to prevent inflow of glass to the pump chamber during each downstroke of the plunger and for a predetermined part of each upstroke of the plunger and for permitting inflow of glass to the pump chamber before the beginning of the succeeding downstroke of the plunger.

9. Apparatus for feeding molten glass from a supply body, comprising a container for the glass, said container having a pump chamber submerged by the glass and terminating at its lower end in a discharge outlet, a reciprocating internal flow plunger having its lower end portion operating in the pump chamber, a vertically movable valve for controlling flow communication between said plunger and the pump chamber, and means to open the valve to allow inflow of glass to the pump chamber during retraction of the plunger and to close the valve to prevent backflow of glass from the pump chamber to the internal flow passage of the plunger during the expulsive movement of the plunger.

10. Apparatus for feeding molten glass from a supply body, comprising a pump chamber having a discharge outlet at its lower end and submerged by glass of the supply body, a reciprocating plunger having its lower end portion working in the pump chamber and fitting the latter closely enough to prevent appreciable flow movement of glass between the plunger and the walls of the pump chamber while maintaining constantly a sealing layer of glass around the plunger, said plunger having an internal flow passage for the inflow of glass from the supply body to the pump chamber, a valve and means for operating the valve to allow inflow of glass to the pump chamber during retraction of the plunger and to prevent backflow of glass from the pump chamber during the expulsive movement of the plunger.

11. In mechanism for feeding molten glass, a moving impeller having a flow passage through which the glass is intermittently fed, a valve and operating connections therefor mounted to move with the impeller and also to move relatively thereto, means for moving the impeller and its valve, and separate means for periodically moving the operating connections to open and close the passage, independently of the movements and positions of the impeller.

12. In mechanism for feeding molten glass, a moving impeller having a flow passage through which all the glass is intermittently fed, a valve and operating connections therefor carried by the the impeller structure and movable relatively thereto, means for moving the impeller structure and its valve while maintaining their relative position, and means for moving the valve periodically relative to the impeller to open and close the passage at any position of the impeller movements and independently of those movements.

13. In mechanism for feeding molten glass, a moving impeller having a flow passage through which the glass is intermittently fed, a valve mounted to move with the impeller structure, a lever pivotally mounted on the impeller structure and connected with the valve, and means for operating the lever to open and close the passage independently of the movement and variation of movement of the plunger structure.

14. The method of feeding a measured charge of molten glass from a supply body thereof, which comprises forcing a compact column of glass from the supply body into one end of a pump chamber through the interior of a reciprocating piston therein by differential air pressure induced by retractive action of the piston, and forcibly discharging from the opposite end of the chamber a measured charge of the glass by expulsive action of the piston while substantially preventing other escape of the glass from the chamber to maintain accurate measurement of the charge.

15. The method of feeding a charge of molten glass from a supply body thereof, which comprises collecting in a chamber having a valveless outlet, by pumping action of a reciprocating piston in the chamber, a volume of glass consisting of a component of residual glass retained in the bottom of the chamber from the preceding feeding operation and sealing the outlet to exclude air therefrom and of a component of new glass which is forced in a compact column through the piston into the chamber and behind the residual glass therein by atmospheric pressure induced by retractive movement of the piston therein, and forcibly discharging through the bottom of the chamber by expulsive movement of the piston a measured charge having the residual glass at its leading end while substantially preventing other escape of glass from the chamber, to maintain accurate measurement of the charge and to discharge the residual glass in advance of the new glass.

16. The method of feeding a measured charge of molten glass from a supply body thereof, which comprises forcing a compact column of glass from the supply body into one end of a pump chamber through a flow passage within a reciprocating piston therein by differential atmospheric pressure on the surface of the supply body induced by retractive movement of the piston, and forcibly discharging through the opposite end of the chamber by expulsive movement of the piston a measured charge of the glass while substantially preventing all other escape of glass from the chamber to maintain the weight and volume of the charge.

17. The method of feeding a measured charge of molten glass from a supply body thereof by pumping action which consists in forcing into a pump chamber through a piston reciprocating therein, a volume of new glass equal to the charge to be fed, adding it to and behind residual glass retained in the bottom of the chamber from the preceding feeding operation substantially segregating said new glass from the supply body, and discharging the measured charge from the chamber while so segregated.

18. In mechanism for feeding molten glass, a vertically reciprocating impeller having a flow passage through which the glass is intermittently fed, a vertically reciprocating valve for the flow passage, laterally moving means for opening and closing the valve, and connecting means for converting the lateral movements of the moving means into vertical movements of the valve, comprising an angle lever pivotally mounted on the plunger structure and connecting the laterally moving means with the valve.

19. In mechanism for feeding molten glass, a vertically reciprocating impeller having a flow passage through which the glass is intermittently fed, a vertically reciprocating valve for the flow passage, a laterally movable guide member for opening and closing the valve and connecting means for converting the lateral movements of the guide member into vertical movements of the valve, comprising an angle lever pivotally mounted on the plunger structure, one portion of the angle lever being connected with the valve and the other arm engaging with and sliding in the laterally-movable guide member, and a cam for moving the guide member to operate the valve in timed relation to the reciprocations of the impeller.

20. Apparatus for feeding molten glass from a supply body, comprising a pump chamber, a reciprocating pump piston in the chamber having an inflow passage through it from the supply body into the chamber, a valve for the inflow passage, automatically operated mechanism to open the valve to admit a regulated volume of glass from the supply body through said passage during each retractive movement of the piston, and manually adjustable means for limiting the closing movements of the valve independently of the limit of its opening movement.

WILLIAM H. HONISS.